Patented July 21, 1942

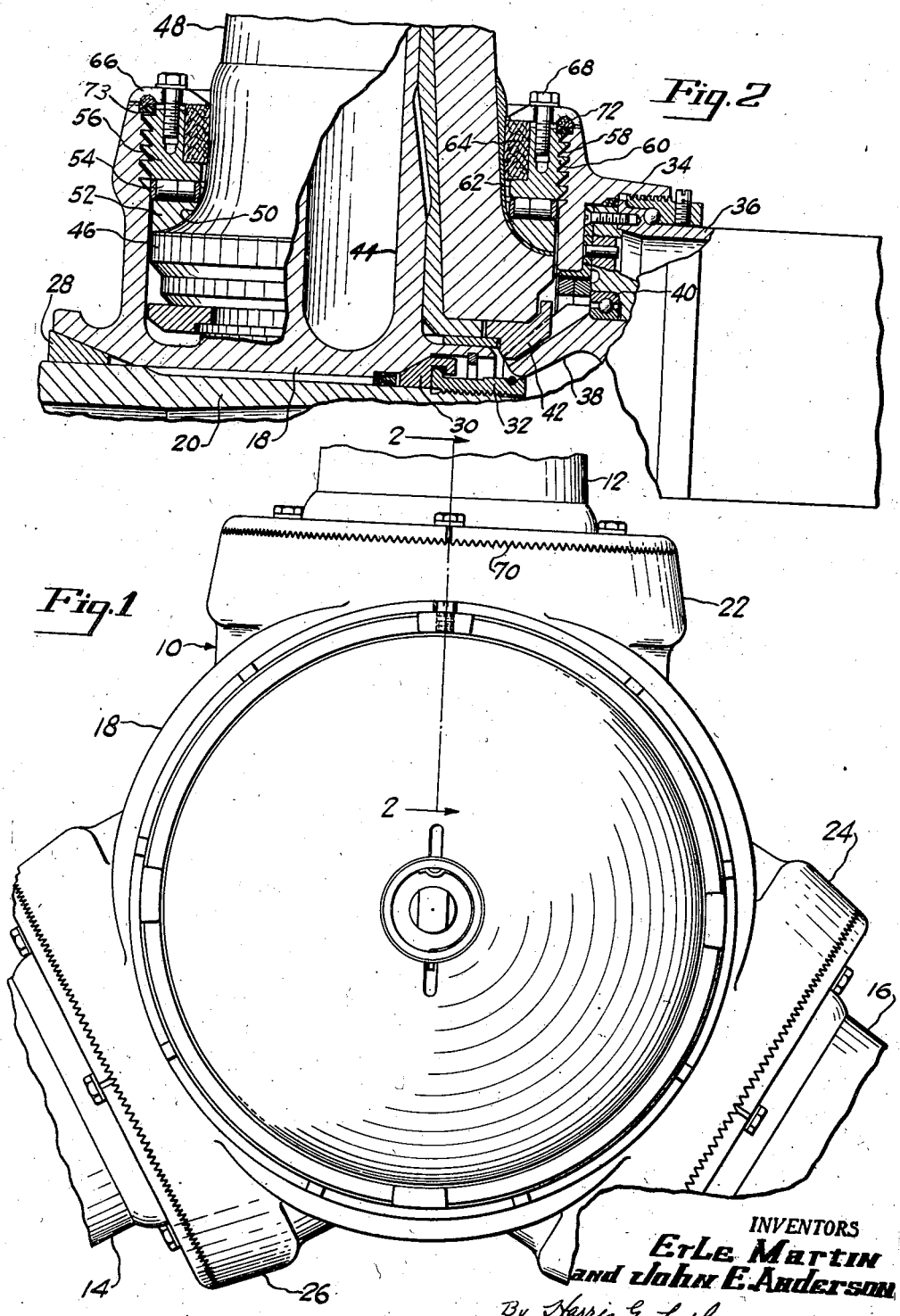

2,290,196

UNITED STATES PATENT OFFICE 2,290,196

AERONAUTICAL PROPELLER

Erle Martin, West Hartford, and John E. Anderson, Portland, Conn., assignors to United Aircraft Corporation, East Hartford, Conn., a corporation of Delaware Application July 30, 1938, Serial No. 222,230

5 Claims. (Cl. 170—162)

This invention relates to an improvement in aeronautical propellers and has particular reference to improvements in a unitary or one piece hub structure for such a propeller.

An object of the invention resides in the provision of an improved one piece hub structure for supporting a plurality of propeller blades in such a manner that the blades may be rotated relative to the hub structure.

A further object resides in the provision of an improved blade retaining means for securely fastening the blades in the hub structure for rotation relative thereto.

Other objects and advantages will be more particularly pointed out hereinafter or will become apparent as the description proceeds.

In the accompanying drawing, in which like reference numerals are used to designate similar parts throughout, there is illustrated a suitable form of propeller hub structure for the purpose of disclosing the invention. The drawing, however, is for the purpose of illustration only and is not to be taken as limiting or restricting the scope of the invention as set forth in the accompanying claims.

In the drawing, Fig. 1 is a front elevational view of a propeller hub constructed according to the invention and, Fig. 2 is a partial sectional view on the line 2—2 of Fig. 1 looking in the direction of the arrows.

Referring to the drawing in detail; the numeral 10 generally indicates the improved one piece hub structure within which are mounted a plurality of propeller blades for propeller pitch adjusting rotational movements with respect to the hub structure. In the present illustration three blades, as indicated at 12, 14 and 16, are shown in fragmentary elevation. While a three blade hub has been illustrated for the purpose of disclosing the invention it is to be understood that the invention is equally applicable to propellers having any desired number of blades.

The improved hub structure is constituted in general by a sleeve or body portion 18 which is rigidly secured to and carried by the projecting end of the propeller drive shaft 20, and an annular socket for the base or root end of each blade, as indicated at 22, 24 and 26. The body portion 18 is provided with a longitudinal internally splined circular aperture to receive the splined end of the drive shaft 20. The ends of this aperture are flared outwardly to receive the locating split cones, as indicated at 28 and 30, and the hub is retained on the shaft by suitable means, such as the nut 32, screw threaded upon the externally threaded end of the drive shaft 20.

At its forward end the hub structure 10 is provided with a large circular aperture surrounded by an internally threaded annular flange 34 to which is secured the base end of a dome member 36 which encloses the propeller pitch changing mechanism. This pitch changing mechanism operates to rotate the gear sector 38, rotatably supported in the hub member by suitable means such as the anti-friction bearing 40, which gear sector meshes with respective gear sectors, as indicated at 42, secured, one to the base end of each propeller blade.

Within each of the blade receiving sockets there is an integral coaxial radial arm 44 which projects into the interior of the hollow base end of the respective blade and provides a suitable bearing for rotational movement of the blade with respect to the hub and also transmits most of the driving force from the drive shaft 20 to the respective blades. The portions of the hub where the arms 44 join the body portion 18 are provided each with a flat surface which acts as a bearing surface for the inner end of the respective blade.

The base or root end of each blade is provided with an outwardly extending radial flange, as indicated at 46, connected to the shank portion 48 by means of a fillet 50 of large radius in a manner well known to the art. The fillet 50 receives an annular bearing race 52 having one surface curved to fit upon the fillet and the other surface smoothed to receive suitable anti-friction elements, such as the rollers 54, which bear in turn against the fixed annular race 56 rigidly secured in the respective blade receiving socket portion of the hub structure. These elements 50 and 56 are each of a one piece construction and are assembled on the blade before forging of the blade is completed, in a manner well known to the art.

Each blade socket is provided near its open or outer end with internal buttress threads 58 having flat sides facing the shaft 20 or axis of the hub structure, as is clearly illustrated in Fig. 2. The outer race members 56, or suitable separate retaining nuts bearing thereon, are each provided with similar buttress threads 60 having their flat sides facing in the opposite direction so that they mesh properly with the threads 58. The flat sides of these threads are substantially parallel to radii of the outer race members and the annular portions of the sockets and are so dimensioned that only these flat radial faces are in contact when an outer race member is in properly adjusted position in a respective socket.

This construction permits the outer race member to float or move radially to a limited extent in the socket to provide necessary flexibility to the blade mounting. Each race 56 is generally cylindrical in form and is provided at its inner end with an inwardly extending radial flange 62, the undersurface of which constitutes a portion of the bearing surface for the anti-friction roller 54. This construction of the race members 56 provides an annular space of substantially rectangular cross-section to receive the flexible packing 64 between the race and the adjacent portion of the shank of the respective propeller blade. Preferably the portion of the blade shank received in the blade socket is protected by a layer of a suitable plastic composition such as "micarta" against which the packing 64 is compressed. The packing is compressed in the packing space by a two piece split annular washer or cover plate 66 having an external diameter substantially the same as the external diameter of the blade socket and an internal diameter somewhat larger than the diameter of the adjacent portion of the associated propeller blade shank so that the washer does not at any time contact the blade. This washer 66 overlies the outer end of the blade socket, the outer end of the associated outer race member 56, and the outer end of the associated body of packing material 64 and the sections thereof are secured to the socket by suitable means such as the cap screws 68 which project through the plate or washer and are screw threaded into suitable apertures provided in the cylindrical portion of the outer race 56. The end face of the hub socket is provided with a series of small angular teeth or serrations and the surface of the plate 66 which overlies the outer end of the blade socket is provided with similar serrations, as indicated at 70 in Fig. 1. The cap screws 68 and serrations 70 combine to provide a suitable lock for positioning the outer race 56 in the end of the blade socket. The race is screwed into the socket upon the buttress threads 58 until the proper load is placed upon the anti-friction elements 54. The plate or washer 66 is then applied and positioned so that the apertures in the plate register with the screw threaded bores in the race member 56. The cap screws 68 are then inserted and tightened down and the race member 56 is then securely locked in its adjusted position in the blade socket and the buttress threads are preloaded. The serrations 70 are made sufficiently small so that the serrations and the screw receiving apertures and bores will line up with only a very slight adjustment of the race member 56 in the socket. As the cap screws 68 are tightened down the overlying portions of the plate 66 bears upon and compresses the packing material 64 to provide a leak proof connection between the race 56 and the adjacent portion of the blade shank. At the same time the plate 66 compresses a ring of packing material 72 located in matching grooves provided in the race 56 and blade socket at the outer end of the threads 58 and 60 and in the thread overlying portion of the locking plate 66 upon a beveled washer 73 so that the screw threaded connection between the race member 56 and the blade socket is also protected against leakage and oil is allowed to cover the buttress threads.

While a particular constructional arrangement has been illustrated and described for the purpose of disclosing the invention it is to be understood that the invention is not limited to the particular construction so illustrated and described but that such changes in the size, shape and arrangement of parts may be resorted to as come within the scope of the sub-joined claims.

Having now described the invention so that others skilled in the art may clearly understand the same, what it is desired to secure by Letters Patent is as follows:

What is claimed is:

1. In a propeller having a one piece hub and a blade mounted for pitch changing rotational movements in a blade receiving socket therein, a flange on the inner end of said blade, an inner annular bearing race carried on said blade flange, an outer annular bearing race secured in the outer end of said blade receiving socket by means of interengaging buttress threads having their contacting surfaces substantially in planes radial to the concentric axis of said outer annular race, anti-friction elements between said races, said buttress threads having a loose fit to permit said outer race to move to a limited extent with respect to said anti-friction elements, and means retaining said outer race in adjusted position in said socket, said retaining means comprising, an annular plate overlying the outer end of said socket and the outer end of the outer race, interengaging teeth between one of said outer ends and the overlying portion of said plate, and means rigidly securing said plate to the other of said outer ends.

2. In combination with a one-piece propeller hub including a shaft receiving body portion, a blade receiving socket, and a blade mounted for pitch changing rotational movements in said socket, a flange on the inner end of said blade, an inner annular bearing race carried on said blade flange, an outer annular bearing race secured in the outer end of said blade receiving socket by means of interengaging buttress threads having their contacting surfaces substantially in planes radial to the concentric axis of said outer annular race, anti-friction elements between said races, said buttress threads having a loose fit to permit movement of said outer race to a limited extent with respect to said anti-friction elements, and means retaining said outer race in adjusted position in said socket, said retaining means comprising, a split annular locking plate overlying the outer end of said socket and the outer end wall of said outer race and having serrations engaging with corresponding serrations in the outer end of the wall of said socket, and a means firmly securing said bearing plate to said outer race.

3. In combination with a one-piece propeller hub including a shaft receiving body portion, a blade receiving socket, and a blade mounted for pitch changing rotational movements in said socket, a flange on the inner end of said blade, an inner annular bearing race carried on said blade flange, an outer annular bearing race secured in the outer end of said blade receiving socket by means of interengaging buttress threads having their contacting surfaces substantially in planes radial to the concentric axis of said outer annular race, anti-friction elements between said races, said buttress threads having a loose fit to permit movement of said outer race to a limited extent with respect to said anti-friction element, an oil tight packing between said outer race and the adjacent portion of said propeller blade, and means retaining said outer race in adjusted position in said socket, said retaining means comprising a flat annular locking plate overlying the outer end of the wall of said socket, the outer end of said outer race member and said body of packing material and having serrations engaging with corresponding serrations in the outer end of the wall of said socket to restrain said plate against rotation relative to said socket, and cap screws rigidly securing said locking plate to said outer race member in a position to retain and compress said packing material.

4. In combination with a one-piece propeller hub including a shaft receiving body portion, a blade receiving socket, and a blade mounted for pitch changing rotational movements in said socket, a flange on the inner end of said blade, an inner annular bearing race carried on said blade flange, an outer annular bearing race secured in the outer end of said blade receiving socket by means of interengaging buttress threads having their contacting surfaces substantially in planes radial to the concentric axis of said outer annular race, anti-friction elements between said races, said buttress threads having a loose fit to permit movement of said outer race to a limited extent with respect to said anti-friction elements, an oil tight packing between said outer race and the adjacent portion of the propeller blade, an oil seal at the outer end of said buttress threads, and locking means restraining said outer race against rotation relative to said socket and retaining and compressing said packing and said oil seal.

5. In a propeller blade and hub combination in which the blade is rotatably mounted in the hub for pitch changing movement and is retained therein by an anti-friction thrust bearing and retaining nut and a fluid seal packing is included between said blade and said hub; a combined nut locking and packing retaining split cover plate surrounding said blade and overlying said nut, said packing and the adjacent portion of said hub, screws securing said plate to said nut, and interengaging teeth on said hub and the adjacent portion of said cover plate to restrain said plate and said nut against rotation relative to said hub.

ERLE MARTIN.
JOHN E. ANDERSON.